United States Patent Office 3,294,549
Patented Dec. 27, 1966

3,294,549
PARTIALLY-DEFATTED NUT MEATS
AND PROCESS
Henry L. E. Vix, Metairie, James J. Spadaro, New Orleans, and Joseph Pominski, Metairie, La., assignors to the United States of America as represented by the Secretary of Agriculture
No Drawing. Filed Feb. 12, 1965, Ser. No. 432,432
5 Claims. (Cl. 99—126)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for producing partially-defatted nut meats and to the products so produced. More specifically, it relates to a process for removing high-calorie oil from nut meats by mechanical pressing and, thereafter, reconstituting the distorted kernels to their general original physical size and appearance by expanding them in an aqueous vehicle. The reconstituted nut meats are not physically damaged by the process, have a high-protein content and, after drying, or drying, roasting and flavoring, the resulting products have a wide variety of food uses.

As used herein, the term "nut meats" includes whole or half "kernels" of nuts, such as peanuts, walnuts, filberts, pecans, almonds, Brazil nuts, macadamia nuts, cashews, hickory nuts, beechnuts, acorns, and the like. Because of their wide production in the world, and particularly in the United States, the term "peanuts" will be used frequently below as illustrative of these "nut meats."

The expression "removing the high-calorie oil from nut meats by mechanical pressing," as used herein, means removing or extruding part, or most, i.e., about 20 to 90 weight percent of the high-calorie oil from the kernels by mechanical pressure. The individual kernels are reduced to less than their original size and are physically *distorted* during the process.

As used herein, the term "reconstitution" or "expansion" relates to the conversion of the compressed, distorted nut meats into their general original physical size and shape by expansion in an aqueous vehicle, sometimes referred to below as "aqueous solutions" or "aqueous media." The reconstituted kernels in their "moisture-laden" condition have absorbed (or sorbed) about from 35 to 70 weight percent water, or aqueous media, based on the *wet weight* of the nut meat. The reconstituted kernels, after drying, are "partially-defatted, high-protein" products, as it is estimated that about eighty percent of the calories in nut meats are in the oil.

The term "flavoring" as used herein includes "seasoning."

It is a prime object of our invention to provide new partially-defatted, high-protein food products having excellent texture, flavor, aroma, taste, physical appearance and improved shelf-life.

It is our further object to achieve these desirable partially-defatted, high-protein food products by removing high-calorie oil from nut meats by mechanical pressure.

It is our still further object to reconstitute the mechanically-pressed, distorted nut meats to their original general size and shape by expanding them in aqueous vehicles.

It is our still further object to dry, or dry, roast and flavor these reconstituted, moisture-laden nut meats without physical damage to the reconstituted and dried kernels. Possible contamination with aflatoxin may be greatly reduced.

The production of nut meats, particularly peanuts, is of vital concern to the United States. During the past few years, production of peanuts has exceeded their consumption and large quantities have been placed in storage. These peanuts have a high oil content, perhaps as high as 50 weight percent, and about 80 percent of the total calories are in this oil. Accordingly, they are considered to be high-calorie foods. If, for example, 20 percent of the oil containing 80 percent of the calories is removed, the calorific content of the nut meats is reduced about 16 percent, or nearly one-sixth. When about 90 percent of the oil is removed, the calorific content is reduced about 72 percent, or nearly three-fourths. Millions of people in this country are fat and want to do something about it—as long as it is not too unpleasant. These partially-defatted, high-protein nut meats with reduced oil content seem to offer these millions just what they want—a way to control weight without giving up the pleasure of eating nut meats, or confections containing nut meats.

In the past, peanuts have been roasted in hot oil. During this roasting process, the nut sorbs 2 to 3 weight percent of the oil used in the roasting process. This adds even more calories to the already high-calorie product. Consequently, the consumer has continued to resist eating these delicacies. Attempts have been made to overcome the resistance of consumers to the use of these high-calorie nut meats. In one such attempt, the nut meats (frequently called kernels) have been *dry-roasted*. This process is usually carried out while the kernels are in the "skins" (the brownish membrane surrounding the kernel). Dry-roasting does eliminate the 2 to 3 weight percent oil picked up by the kernels in oil-roasting. However, dry-roasting does not reduce the amount of oil *inside* the kernel and, consequently, the nut meat remains a high-calorie food. As a result, dry-roasted nuts have not been generally accepted by the millions of potential users noted above. Further, during dry-roasting, the skins are loosened and part, perhaps all, of these skins separate from the kernel and "float" over the surface. This reduces the pleasing appearance of these nut meats. Perhaps the most serious disadvantage of dry-roasting is the tendency for the kernel to become "mottled," that is, covered with small whitish spots which give a blister-like appearance. This also imparts a displeasing appearance to the kernel. Attempts have been made to overcome this "mottled" appearance by sprinkling salt, sugar, starch, and the like on the surfaces of the nuts. The mottled appearance shows up on the kernels which have no skins as well as under the skins. When these skins are loosened and later released from the kernel, this mottled effect becomes visible. Further, since dry-roasting does not remove any of the oil from *inside* the kernel, the dry-roasted nut meats are still a very high-calorie product.

In another method, oil from *inside* the kernel has been extracted by the use of a solvent, such as commercial hexane. Some oil is removed by this process but there are many disadvantages. In the first place, hexane is flammable and creates a hazard for the operator. In the second place, solvent extraction of the oil from the kernel requires time, usually several days. In the third place, the solvent must be separated from the extracted oil, and both solvent and oil must be recovered. This recovery step adds additional time to the process and simultaneously increases the cost of the operation. In the fourth place, removal of the last traces of the solvent from the kernels is difficult, and this residual solvent adversely affects the pleasing aroma and flavor of the nut meats. Last, but not least important, the solvent may remove some of the soluble solids which contribute to the flavor of the kernels. Consequently, it will be seen that there is a need for a process for removing high-calorie oil from nut meats and simultaneously producing commercially-acceptable, partially-defatted, high-protein products having excellent flavor, aroma, taste, texture, appearance, and good shelflike. The kernels must not be physically damaged by the process.

In accordance with this invention, the disadvantages outlined above are avoided by a procedure which basically involves the following steps:

(1) Charging to a mechanical press unblanched (with skins), or blanched (without skins), high-calorie nut meats.

(2) Pressing the unblanched, or blanched, nut meats to remove about from 20 to 90 weight percent of the high-calorie oil. The individual kernels are physically distorted by the process.

(3) Blanching (loosening the skins) the nut meats (kernels) by physical means when unblanched nut meats are pressed.

(4) Removing the loosened skins from the blanched nut meats by suction air.

(5) Reconstituting the blanched, pressed, distorted nut meats to their general original size and shape by immersion in an aqueous vehicle. During reconstitution the kernels sorb (absorb) considerable water, usually increasing their water, or moisture, content to about from 35 to 70 weight percent, based on the weight of the reconstituted moisture-laden product.

(6) Drying the reconstituted, moisture-laden nut meats to have a moisture content ranging about from 3 to 8 weight percent, based on the total weight of the dried product. These dried, reconstituted, blanched, partially-defatted, high protein kernels (or products) may then be recovered and sold; or they may be further processed.

(7) Roasting the dry nut meats, especially peanuts, until the dry surfaces acquire a shiny appearance resulting from the exudation of a layer of oil from the interior of the kernel, and accompanied by subsequent browning which indicates completion of the roasting operation.

(8) Immediately cooling the roasted nut meats to avoid over-roasting. The cool, roasted product may be recovered; or it may be processed further.

(9) Flavoring the cool, roasted nut meats.

(10) Recovering the reconstituted, blanched, flavored, partially-defatted, high-protein nut meats.

As so described, the preparation of partially-defatted high-protein nut meats from high-calorie starting materials appears deceptively simple. However, each of the several steps is essential. Each involves certain criteria which within certain ranges must be observed. Therefore, each will be more fully discussed in relation to the problem solved thereby, as well as its place in the overall treatment. By the process, the high-calorie nut meat is converted into a partially-defatted, high-protein product useful in a wide variety of confectionery foods. Most important, the reconstituted, dry kernel is not physically damaged.

THE PRESS

Any type of commercially available mechanical press which is equipped with a gage and which is capable of producing pressures up to about 5,000 pounds per square inch (p.s.i.) may be used. A hydraulic press is convenient and causes excellent results to be obtained. The pressing operation as outlined below may be "cold," or "hot." When the latter is used, the press is equipped with a means for heating.

COLD PRESSING

Raw- or toasted-peanuts (whole or halves) are charged into a mechanical press and subjected to a pressing operation to remove about from 20 to 90 weight percent of the high-calorie oil. These raw- or toasted-nuts are obtained following the shelling operation and may be still enclosed in the skins (unblanched) or they may be blanched (skins removed). These raw nuts usually contain about from 3 to 8 weight percent moisture and the kernels are white, or only slightly off-white. Toasted (or partially roasted) peanuts contain about from 2 to 5 weight percent moisture. The amount of moisture is easily determined by analysis of the high-calorie product. While the process of our invention is applicable to nut meats in general, as noted above, peanuts will be used herein for illustrative purposes but the invention is not limited to peanuts. It is possible to use any of the commercial varieties of peanuts, but we prefer to use Virginia, Spanish, or Runners, and especially those varieties that are commercially desirable.

The pressing operation may be accomplished by any mechanical means known to those skilled in the art. Good results are obtained with a hydraulic press. The amount of pressure to be applied will depend upon the type of nut meat, the amount of oil to be removed, the length of time the pressure is maintained, the moisture content of the kernel, and, to some extent, upon the temperature of the kernels. For cold pressing, a pressure of about 2,000 pounds per square inch (p.s.i.) over a period of 0.5 to 2.0 hours at ambient room temperature (0 to 40° C.) is a good practice. However, sufficient pressure should be applied and maintained to remove the desired amount of oil, preferably about from 20 to 90 weight percent of the high-calorie oil initially present in the kernels. Where pressing is by hydraulic means and at ambient room temperatures (cold pressing) either unblanched (with skins) or blanched (skins removed) nut meats may be used. An analysis of the original lot of shelled nuts to be processed will give the total amount of oil present. By weighing the charge, and the oil removed (expressed), it is a simple matter to determine when about from 20 to 90 weight percent of the oil has been extracted.

When unblanched (with skins) nut meats are used as the starting material, the skins must be removed later. We prefer to remove the skins immediately after the pressing operation. This involves additional steps and will be discussed more fully below under the heading Blanching Unblanched Nut Meats.

It is an essential feature of the pressing step that the nuts have a proper moisture content ranging about from 3 to 8 weight percent. When the moisture content is too low, the maximum amount of oil is difficult to remove. Further, nuts having a low moisture content are more brittle and are more likely to suffer physical damage. When the moisture content is too high (above about eight weight percent), the nut tends to become "squashy" during pressing and the efficiency of oil removal is decreased. (See Example 12.) Further, higher moisture tends to promote growth of molds, including aflatoxin, during storage of the shelled nuts prior to pressing. The total volume of the charge of nut meats is greatly reduced to about one-sixth to one-half of the original volume during the mechanical pressing. Further, the individual kernels are also reduced in size (approximately one-fourth to one-half) and simultaneously physically distorted. To secure commercially acceptable products, these physically distorted kernels must be reconstituted to their original general size and appearance. This will be discussed below.

HOT PRESSING

It is also within the scope of this invention to employ a "hot-pressing" technique. In this process, unblanched or blanched, raw- or toasted-nuts (whole or halves) are placed in a closed container equipped with a stirrer, and are heated with direct and/or indirect steam. Heating with direct and/or indirect steam, and stirring, are continued until the temperature of the kernels has reached about from 180° to 220° F. During this steaming the moisture in the nut meats may increase to about 10 to 15 weight percent. The flow of steam is then discontinued, but heating and stirring are continued in the absence of steam until the moisture content of the nut meats has been reduced to about from 3 to 8 weight percent. Then the batch of hot-steamed kernels is charged quickly to the mechanical press, and pressure exerted on the hot nut meats until about from 20 to 90 weight percent of the oil has been expressed, or removed. Usually a pressure of about 2,000 p.s.i. for about 60 minutes is a good practice. In some instances, higher pressures and/or longer periods of time may be required. As noted above, by analyzing the nuts for oil before they are steamed, and by weighing the charge and the amount of oil extracted, it is possible to determine when the desired quantity of the high-calorie oil has been expressed.

During hot-pressing, the physical size of the individual, pressed kernels is reduced to approximately one-fourth to one-half their original size and, of course, they are badly distorted and must be reconstituted. Since some, perhaps most, of the high-calorie oil has been removed, the "hot-pressed" kernel is also a partially-defatted, high-protein product.

BLANCHING UNBLANCHED NUT MEATS

When unblanched (with skins) nut meats, especially peanuts, are used as starting material, they may be blanched (skins removed) later. It is an advantage of either the cold-or hot-pressing methods that the skins do not appear to be reduced in size as are the kernels. Consequently, the skins are loosened from the kernels during the pressing operation, and those loosened skins are easily separated therefrom by physical means, such as by rubbing between moving surfaces. *This was unexpected.* Thereafter, the separated skins may be withdrawn from the kernels by suction air. In one such apparatus, the pressed distorted kernels are conveyed onto a table equipped with a flexible, rough sheet and brought into contact with a revolving circular plate which is also equipped with a flexible, rough sheet. The "rough" sheet (surface) may be "ribbed," or covered with "knobs" or "solid pins." As these rough sheets roll over the kernels, the loosened skins are removed (the kernels are blanched) and then withdrawn from the apparatus by suction air. In another method, the nuts are passed between two parallel belts which are preferably horizontally positioned. One, preferably both, of the belts is equipped with a flexible, rough sheet (surface). One of the belts may be stationary and the other moving to cause the nuts to roll, thereby exposing the entire skin to the action of the rough surface; or one of the belts may move slowly and the other more rapidly. In either method, the skins are loosened and separated from the kernels (by physical means) after which the skins are withdrawn from the apparatus by suction air.

The distance between the flexible, rough sheets must be adjustable and be easily regulated to produce a satisfactory blanched product. Some nuts are much larger than others and the distance between the rough sheets must be adjusted accordingly.

The flexible, rough sheets may be polyethylene, or rubber, or other suitable oil-resistant flexible material. However, it is an essential feature of the flexible, rough surfaces that they are softer than the surface of the nut, or kernel, being blanched in order to avoid physical damage (scratching) to the nut meat.

As noted above, blanched, high-calorie nut meats may be used as starting material in the preparation of the partially-defatted, high-protein product of this invention. When such blanched, high-calorie nut meats are employed, the above-described blanching operation is unnecessary. However, regardless of the type of starting material (i.e., unblanched or blanched), we prefer to have the skins removed prior to reconstitution.

RECONSTITUTING THE BLANCHED, PRESSED NUT MEATS

The next step in the process of this invention is to reconstitute (or expand) the compressed, distorted kernels to their general original size and shape. Since the individual kernels were reduced to about one-fourth to one-half their original size during compression, and also badly distorted, reconstitution comprises returning these individual kernels to their general original size and shape.

The compressed, distorted nuts may be reconstituted
 (a) in hot water at atmospheric pressure;
 (b) in hot water under pressure;
 (c) in aqueous vehicles (solutions) at various temperatures; and
 (d) in cold water for various extended periods of time.

The details of these procedures are set forth below.

*Reconstituting in hot water at atmospheric pressure*

The compressed, distorted nuts (or kernels) are placed in a hot, aqueous vehicle (preferably water) at atmospheric pressure in a tank which may be equipped with a mechanical stirrer. The temperature of the water may range about from 150° to 212° F. Under these conditions and when gently stirred, the compressed kernels absorb (or sorb) water and begin to expand, ultimately reaching the general size and shape they possessed prior to the application of mechanical pressure. *This was unexpected.* Further, the reconstituted whole kernels show no visual evidence of physical damage. *This also was unexpected.* The amount of water sorbed ranges about from 35 to 70 weight percent, based on the total weight of the "moisture-laden" kernel.

The length of time necessary to reconstitute the kernels is hot water at atmospheric pressure depends to a large extent upon the starting temperature of the water into which the kernels are dropped. When the kernels are dropped into water having a temperature about from 200° to 212° F., complete reconstitution to the original size and shape may occur in about from 3 to 8 minutes. As might be expected, as the starting temperature of the water is reduced, or the time required to bring it up to the boil is increased, the total time required for the kernels to regain their original size and shape increases. We prefer to drop (or enter) the kernels into water having a temperature of about from 205° to 212° F., wherein a time of about from 3 to 5 minutes causes excellent reconstitution to occur.

Just why the compressed nut absorbs (or sorbs) the water and expands to its general original size and shape is unknown. It may be that the oil is held in small pockets or glands in the nuts, and because of the pliable nature of the raw, or toasted nut, it remains compressed until activated by some liquid. However, we are not limiting our invention to such a theory. Certainly, we had not expected that a membrane which had been coated with oil would absorb an aqueous vehicle, such as water.

When reconstitution is completed, the kernels have sorbed a weight of water about equal to their weight after compression. Consequently, it is essential that the amount of aqueous vehicle present is sufficient to contact all the kernels at some stage during the reconstitution.

It is an advantage of this embodiment of our invention that the reconstitution, or expansion, step also may be carried out as a continuous operation. The compressed kernels may be entered into one large open vessel, or a series of open vessels, or tanks, equipped with stirrers or with moving, perforated bottoms; this arrangement permits the nuts to be carried along the large tank, or from one tank to the next. The rate of flow of the compressed nuts will depend upon the temperature of the water in the various tanks, and the total time required to reconstitute or expand the kernels to the desired size.

It is a further advantage of this embodiment of our invention that the kernels may be started in warm water; then gradually increasing the temperature of the water in the subsequent tanks, as the nuts travel forward, to enhance the efficiency of the operation.

Reconstitution in hot water under pressure

In this method, the compressed, physically distorted nuts are placed in a closed, pressurized kettle preferably equipped with a stirrer, gage, and an inlet for steam and/or water. Or a steam-jacketed kettle may be used which is equipped with a stirrer, water-and-steam inlet, and gage. This embodiment of our invention has the advantage that higher temperatures may be used, the time required to accomplish reconstitution, or expansion being reduced. Pressures ranging about from 5 to 20 pounds have been employed with corresponding water temperatures of about from 220° to 245° F., the time ranging about from 2 to 5 minutes at these temperatures. When higher temperatures and pressures are employed, the time is reduced and satisfactory reconstitution may be accomplished more rapidly. When pressure tanks or kettles are employed, best results are obtained by introducing the kernels into hot water, preferably around 200° F., or higher. Less time is then required to develop the desired pressure with the corresponding higher temperature. Under pressure, kernels sorb water at a more rapid rate than at atmospheric pressure.

It is also within the scope of this invention to carry out a continuous reconstitution under pressure as equipment adaptable for this type of operation is commercially available. However, because of the expense of such equipment, only those processors who handle very large quantities of nuts might choose to use a continuous operation under pressure.

Reconstitution in aqueous solutions at various temperatures and pressures

After the compressed kernels have been blanched (when unblanched starting materials are used), they may be reconstituted in aqueous solutions. These aqueous solutions comprise various aqueous-soluble ingredients, such as sodium chloride, potassium chloride, monosodium gluconate, calcium chloride, vitamins, bicarbonate of soda, sugar, saccharin, honey, cyclamates, starch, and flour; also flavors including barbecue, cheese, onion, mints, maple, paprika, thyme, nutmeg, celery, dill, curry, lemon, raspberry, blackberry, cherry, and the like; and spices, including carroway, cloves, mace, ginger, parsley, bay, basil, allspice, food colors, and the like.

The amounts added will depend upon the taste, flavor, aroma, or other effect desired, the chlorides being used in larger amounts compared with the flavors where a very slight amount will impart a satisfactory flavor or taste.

As noted above, the temperature of the aqueous solution is not an essential feature and may be varied. However, reconstitution or expansion proceeds at a more rapid rate at the higher temperatures and generally will follow the times set forth above for reconstitution in water at atmospheric pressures, or under pressure when that method is used.

The equipment used for reconstitution in aqueous solutions may be a tank (at atmospheric pressure) or a pressure vessel as described above when higher than atmospheric pressures are employed.

It is an advantage of this method of reconstitution that the various ingredients may be added to the aqueous vehicle prior to, or at any time during, the reconstitution, or expansion, period.

It is a further advantage that certain flavors or spices that have a low solubility in water may be dissolved first in water-miscible, organic solvents, such as alcohol, before mixing into the aqueous solutions.

Reconstitution in cold aqueous vehicles for various extended periods of time Some commercial manufacturers of nut products may prefer to reconstitute the pressed, physically-distorted kernels in a cold, aqueous vehicle, such as cold water. When this method is preferred, the blanched kernels are entered into "unheated" water. The temperature of the unheated water as intended here is the temperature of the water as it comes from the tap without previous heating and may vary about from 40° to 85° F., depending upon the source, the geographic location, and the time of the year.

Reconstitution may be carried out under pressure, or in open vessels at atmospheric pressures using equipment described above. Reconstitution may be batchwise, or by a continuous operation wherein the pressed, distorted kernels may be moved from one compartment to another, as described above under the heading "Reconstitution in a Hot Aqueous Vehicle at Atmospheric Pressure."

The time required for reconstitution in cold water will be greater than when hot water is used. However, when atmospheric pressures are employed using tap water in open vessels, satisfactory reconstitution may require about from 30 to 90 minutes, and may be observed visually.

It is an advantage of the cold-water process that special heating equipment is not required.

It is a further advantage that in locations where water is plentiful and cheap, the cold-water process is economical.

It is essential in reconstitution in ambient-temperature water that the nut meat be completely submerged during reconstitution. This reduces the possibility of mold growth.

It is also within the scope of this invention to destroy bacteria which may be present in the reconstituted, moisture-laden kernels prior to drying, or drying and roasting. This may be done by passing the moisture-laden kernels through a dilute, aqueous alkaline solution (e.g., 1 to 3 weight percent sodium hydroxide, or 1 to 3 weight percent ammonium hydroxide) at ambient room temperature, and thereafter washing off the alkaline solution; or the alkali-treated, moisture-laden kernels may be heated at some lower temperature of the order of about from 212° to 250° F. prior to washing; or the moisture-laden kernels may be heated in water at high pressures to give a temperature of about 300° F. prior to drying, or drying and roasting. The chemical constitution of certain molds, such as aflatoxin, is altered by the alkaline solution, or the water at high temperatures, and the activity of these molds is reduced.

After the distorted, compressed kernels are reconstituted, they are "moisture-laden," having absorbed about from 35 to 70 weight percent water (or aqueous solution) based on the total weight of the moisture-laden, reconstituted product. This "moisture" comprises water, or an aqueous solution of ingredients. Before further processing, this moisture must be removed.

The drying and subsequent roasting may be carried out in two steps; or the partially-defatted, high-protein nut meats may be dried and roasted in a continuous operation. The two-step method will be discussed first.

DRYING

Drying may be accomplished by at least four methods:

(a) freeze drying
(b) hot-oil drying
(c) hot-air drying
(d) radiant-heat drying.

*Freeze drying.*—In this process, the reconstituted, moisture-laden kernels are placed in a container and the temperature reduced to about from 0° to 20° F. The frozen, solid mass is then transferred into a chamber equipped with a vacuum pump and the pressure reduced to about from 1 to 10 mm. mercury pressure. The moisture is gradually withdrawn under these conditions until the moisture content of the kernels is reduced to about from 3 to 8 weight percent of the total weight of the dried product.

The reconstituted, dried, blanched, partially-defatted, high-protein products are then recovered.

Dried nut meats have a moisture content of about from 3 to 8 weight percent, and roasted nut meats have a moisture content of about from 1 to 3 weight percent. However, when the nut meats are dried by any of the above processes, it is possible to reduce the moisture content to the range of about from 1 to 3 weight percent *without* the dried kernels being roasted. This is due to the fact that roasting must be carried out at a temperature sufficiently high to cause certain chemical reactions (chemical changes) which bring out the required flavors. This is most essential for peanuts.

*Hot-oil drying.*—Hot-oil drying may be carried out by dipping the moisture-laden kernels in hot oil having a temperature above about 225° F., preferably about from 325° to 350° F. The escaping moisture forms a steam layer around the nut meat and prevents the oil being sorbed by the kernel. This process also permits the dried kernel to retain its partially-defatted, high protein content. The process can be controlled so that the moisture content of the reconstituted kernel may be reduced to about from 3 to 8 weight percent, based on the total weight of the dried product. This 3 to 8 weight percent moisture content is easily determined by operators skilled in the art. When the kernels (especially peanuts) are oil-dried and recovered, they also may be merchandised to vendors who may then roast and sell them as "hot roasted peanuts" having a partially-defatted, high-protein content.

Oils useful in the above process are coconut oil, peanut oil, cottonseed oil, corn oil, and the like. The oil must be edible, free from odor or taste, and not impart an unpleasant taste to the dried product.

*Hot-air drying.*—In the hot-air drying method, the large amount of moisture sorbed by the kernels during reconstitution, or expansion, may be removed by hot air in a fluidized-bed drier, a forced-draft oven, or other hot-air drying means known to those skilled in the art.

It is an essential feature of hot-air drying that the temperature of the hot air be fairly high, preferably not lower than about 225° F. Quite surprising, when the temperature of the drying air is at ambient room temperature, the reconstituted kernels tended to revert to their *compressed* physical dimensions. *This was unexpected.* When the temperature of air applied to these kernels containing sorbed water is about 225° F., or higher, preferably about from 225° to 260° F., the evaporation of water from the surface of the nut meats prevents undue heating and possible burning. Further, air drying at these higher temperatures prevents the kernels from reverting to their compressed physical dimensions.

The time required for drying at these temperatures will depend upon the size of the nuts (Virginia peanuts being larger than Spanish peanuts—Brazil nuts being larger than either), the amount of moisture sorbed by the kernels, the rate of stirring (or tumbling) of the kernels, and the circulation of the hot air over, and through, the nut meats. However, time here is not as essential a factor as the quality of the resulting, dried product. Operators skilled in the art can determine quickly by chewing a nut whether drying is complete, as a newly reconstituted (expanded) nut has a plastic, or rubbery, texture which is mostly lost when the moisture content is reduced to about from 3 to 8 weight percent.

We prefer drying temperatures of air at about from 225° to 260° F., and reducing the moisture content to about from 3 to 8 weight percent of the total weight of the dried product.

The reconstituted, dried, blanched, partially-defatted, high-protein product is then recovered. These recovered products also may be shipped to vendors who roast them immediately before selling, or they may be processed further, e.g., roasting.

*Radiant-heat drying.*—Radiant-heat drying may be accomplished by means of an infrared-heated, rotating cylinder, a dielectric oven, a rotisseries, and the like. Gas-heated sources for emission of infrared (I.R.) waves are also commercially available for processors who prefer to use gas. Infrared driers suitable for this purpose are commercially available.

Water absorbs IR waves of about from 3 to 6 microns, and an alternating-current, paneled source, in which the voltage, or impedance, may be changed to produce the wave lengths of from 3 to 6 microns, is also satisfactory.

In order to prevent the moisture (steam) that has been evaporated from the surfaces of the moisture-laden kernels from absorbing these IR waves of from 3 to 6 microns, it is desirable to withdraw the moisture as it is formed by means of a vacuum, moving air, and the like. The temperature of the drying kernels should be maintained at about from 180° to 225° F.

It is an advantage that the kernels may be rotated, or gently stirred to present moist surfaces to the IR waves. Drying, stirring, and withdrawal of evaporated moisture are continued until the moisture content of the nut meats is reduced to about from 3 to 8 weight percent on the total weight of the dried product. The dried product may be recovered and sold as such, or it may be processed further as by roasting, or roasting and flavoring.

After drying and recovering, regardless of the method of drying employed, the reconstituted, blanched, partially-defatted, high-protein product may be "boiled" in water (without or with flavor ingredients) as many families enjoy "boiled" peanuts; or, the reconstituted, dried, blanched, partially-defatted, high-protein recovered products may be roasted, or roasted and flavored (seasoned), as will be discussed below.

ROASTING

The partially-defatted, high-protein nut meats are generally roasted, using radiant-heat, hot air, or hot oil, at a temperature higher than that normally used in the drying operation. Roasting includes further loss of moisture as well as imparting to the nuts a commercially-acceptable color and flavor. Suitable roasting temperatures for these nut meats preferably range about from 250° to 500° F. Just how these higher temperatures affect the flavor is not completely understood. However, it appears that the higher temperatures effect certain chemical changes in the components of the kernel which produce the desired flavor.

The desired color will depend upon the end-use. For some uses, light-brown colors are desirable; for other uses, darker-brown colors are required. However, it is essential that the roasting be discontinued before the kernel has acquired a "burnt" taste, as such products are commercially unacceptable.

It is an advantage of this invention that in radiant heat, or hot-air, roasting the hitherto dry nut, especially peanuts, suddenly acquires a shiny appearance due to a coating of oil exuding from the interior of the kernel, indicating that the roasting is nearly completed. *This was unexpected.*

When this shiny surface appears, accompanied by subsequent browning, it is critical that the kernels be cooled as rapidly as possibly, in order to avoid "Over-roasting." The moisture content of roasting peanuts may range about from 1 to 3 weight percent.

Particular equipment used for roasting in hot-air, or by radiant heat, will be discussed below in "Drying and Roasting Continuously."

COOLING

Various cooling methods may be used. We prefer passing a cool, or cold, flow of air over, and through the roasted kernels, whereby the temperature is rapidly reduced to less than about 100° F. The reconstituted, dried, blanched, roasted, cooled, partially-defatted, high-protein products may be recovered at this point, or they may be processed further, as by flavoring.

DRYING AND ROASTING CONTINUOUSLY

*Hot-air or radiant-heat methods.*—Processors who handle large quantities of flavored nut meats prefer to dry and roast in a continuous operation, sometimes described as a one-step process. Excellent results are obtained with an infrared-heated rotating cylinder, a dielectric oven, a forced draft oven, fluidized-bed hot-air drier, rotisserie, and the like. Beginning, or drying temperatures should be fairly high, at an air temperature of the order of about from 225° to 500° F., to prevent the kernels from reverting to their earlier physical dimensions, when they were in the compressed state. The danger of overheating at this point again is eliminated by the cooling effect of the evaporating moisture.

It is an advantage of this method that during the drying and most of the roasting operation, the kernel, or nut, appears to be dry on the surface. However, as noted above, toward the end of the roasting operation a coating of oil from inside the nut, especially on peanuts, appears on its surface and imparts a shiny appearance, accompanied by subsequent browning to the roasted product, indicating that the operation is nearly completed. Again, immediate and rapid cooling is required to prevent development of a "burnt" taste. When desired, the roasted product may be recovered. It will have a moisture content ranging about from 1 to 3 weight percent.

*Hot-oil method.*—Another continuous method for drying and roasting continuously is by the "hot-oil" method. The reconstituted, moisture-laden nut meats, containing about 35 to 70 weight percent sorbed water, based on the weight of the wet kernel, is entered into the hot oil having a temperature about from 225° to 350° F., preferably about from 325° to 350° F.

Again, the escaping moisture during drying forms a steam layer around the nut meat and prevents the oil being sorbed by the kernel. The process is controlled so that the moisture is reduced to about from 1 to 3 weight percent based on the weight of the roasted product. Unlike hot-air drying and roasting, or radiant-heat drying and roasting, the termination of the roasting process cannot be controlled by observation of the oil exuding from the interior of the kernel, but may be readily determined by operators skilled in the art. The same oils listed above for "drying" may be used in the continuous drying and roasting process, coconut oil being preferred because of its economy. The dry and roasted nut meats are then recovered.

Nut meats dried and roasted by this process will contain slightly more calories than the product dried and roasted by hot air or radiant heat. However, they still may be characterized as partially-defatted, high-protein products.

Regardless of the roasting method employed, it is essential that the roasted nut meats be cooled immediately after roasting in order to eliminate any "burnt" taste that might develop from "over-roasting."

It is also within the scope of this invention to subject reconstituted, moisture-laden kernels to a "puffing" treatment, using a puffing gun, or air at about 1,000° F., prior to completion of the drying and roasting operation. The "puffed" nuts retain their general physical appearance but, volume wise, are larger than the individual nuts prior to the pressing operation. These puffed nuts are commercially desirable as snack items, cereals, and the like.

FLAVORING

The reconstituted, dry, partially-defatted, high-protein, cooled and roasted nuts are then salted and/or treated with the necessary ingredients to impart the desired flavor, taste, and aroma. As noted above, various ingredients, such as sodium chloride, potassium chloride, calcium chloride, sodium bicarbonate, monosodium gluconate, saccharin, cyclamates, sugar, honey, starch, flour, vitamins, spices, and flavors may be used. The particular ingredients required will depend upon the end-use of these confectionery food products.

Examples of other flavors are barbecue, cheese, onion, mints, maple, paprika, thyme, nutmeg, celery, dill, curry, and fruits, such as lemon, raspberry, blackberry, cherry, and the like. Examples of other spices are carroway, cloves, mace, ginger, parsley, bay, basil, allspice, and the like.

It is also within the scope of this invention to add traces of food colors.

As noted above, under the heading, "Reconstitution in Aqueous Solutions," some of these ingredients may be included in the aqueous vehicle or media employed in expanding the compressed, distorted kernels and the final roasted product may require little, if any, additional seasoning. Nuts that are to be sold as "salted nuts" may require only salt; nuts that are to be sold for confectionery purposes may require little, if any, salt but may require other ingredients that improve or intensify the aroma, and/or flavor.

The flavored, partially-defatted, high-protein nut meats are then recovered.

It is an advantage of the process of this invention that the layer of oil that appears on the surfaces of the dry nuts near the completion of the roasting operation improves the appearance of the partially-defatted, high-protein product, especially when it is packaged in transparent containers. This layer of oil imparts a shiny appearance to the kernels, especially peanuts.

It is also within the scope of this invention that when the nut meats are dried and/or roasted in oil, or when the amount of oil removed by mechanical pressing is low, say of the order of about from 20 to 40 weight percent, it is desirable to add to the dry, reconstituted nut meat an oxidation inhibitor to further prolong the shelf life of the reconstituted product. Such oxidation inhibitors include butylated hydroxyanisole, butylated hydroxytoluene, $\alpha$-tocopherol, lecithins, propyl gallate, etc.

The following examples will serve to illustrate the various aspects of this invention. Unless otherwise noted, the oil and moisture content of the high-calorie starting material is based upon the total weight of the raw or toasted nut. The moisture content, after reconstitution, is based upon the total weight of the moisture-laden nut. The moisture content of the dried product is based on the total weight of the dried, partially-defatted, high-protein product. The moisture content of the roasted product is based on the total weight of the roasted partially-defatted, high-protein product. The percent oil removed is based on the amount of oil in the original product. In other words, the compositions are based on an "as is" basis. Pressures are indicated in pounds per square inch (p.s.i), and temperatures are in degrees Fahrenheit unless otherwise noted. Flavoring is according to taste and will be so understood. Nut meats (or kernels) with oil removed (expressed, or pressed out) are frequently referred to as "low-fat nuts" or "low-fat peanuts." These *low-fat* products have usually been described above as "partially-defatted, high-protein" products.

In the following examples, commercially-blanched Virginia peanuts are used.

Example 1

Commercially-blanched Virginia peanuts (7 lbs.) containing 3.9% $H_2O$ and 49.2% lipids (oils) were pressed in a hydraulic press at room temperature (84°) and at 2,000 lbs. p.s.i. pressure for 60 minutes. A portion of the pressed, flattened, distorted peanuts, which had 67.5% of their oil removed, and a resulting moisture content of 5.7%, were re-expanded to their original size and shape in a pressure cooker. This was accomplished by mixing 300 grams of the peanuts with 330 grams of water and heating—first from atmospheric to 15 p.s.i. steam pressure in 5.5 minutes, and then an additional 2.5 minutes at the full 15 lbs. pressure. The moist, expanded nuts, having a moisture content of about 53%, were dried and roasted in one operation in a rotating, perforated cylinder using infrared heat at 350° F. for 25 minutes.

The dried, low-fat, or partially-defatted, peanut product with 67.5% of its oil removed had a moisture content of about 3.0%, a uniform color, a "roasted peanut" appearance, and a very desirable taste.

*Example 2*

Another portion of the pressed, flattened peanuts prepared as in Example 1 was re-expanded by mixing 100 grams of the peanuts with 90 grams of water, to which had been added three grams of salt. The mixture was then heated in a pressure cooker to 15 lbs. steam pressure in 3.5 minutes, and for 2.0 minutes at the full 15 lbs. pressure (250° F.). The moist, expanded peanuts were dried and roasted in one operation in the perforated rotating cylinder using infrared heat at 350° F. for 15 minutes.

The dried low-fat peanut product had a moisture content of approximately 2.5%, a uniform appearance, and a desirable, salted-peanut taste.

*Example 3*

Pressed, flattened, peanuts prepared as in Example 1 were re-expanded by mixing 150 grams of the peanuts with 318 grams of water and heated in an open vessel (atmospheric pressure) to 212° F. for three minutes, after which time the peanuts were completely expanded. The mixture was heated an additional 8.5 minutes to evaporate excess moisture without loss of extractable solids. The expanded nuts, which had a moisture content of 48%, were dried in a forced draft oven for 25 minutes at 220° F., and then roasted in the same oven for 15 minutes at 356° F.

These nuts had a good, roasted-peanut taste and their appearance was satisfactory, but the appearance was not as good as the appearance of the roasted peanuts produced in Examples 1 and 2.

The following example will show the feasability of processing whole peanuts whereby they can be pressed to the point of removing about 80 weight percent of the oil and re-expanded to their original size with no appreciable splitting of the kernels.

*Example 4*

Whole unblanched, Virginia peanuts (10.9 lbs.) were pressed in a hydraulic press at room temperature for 60 minutes at a maximum pressure of 2,000 p.s.i. The original nuts had a moisture content of 6.8% and an oil content of 46.2% (49.6% oil on a moisture-free basis). The pressed nuts had a moisture content of 10.3% and an oil content of 15.1%. This oil content is equivalent to removal of 80% of the original oil. The pressed nuts, which showed no evidence of splitting, were blanched by physical means, whereby about 98% of the skins were easily removed. The pressing operation loosened the skins sufficiently to facilitate skin removal (blanching) without resorting to additional drying as is required in normal blanching operations. A portion of these pressed, blanched nuts was re-expanded by mixing 300 grams with 300 ml. water in a pressure cooker, using 7 minutes to attain a pressure of 15 lbs. and heating for an additional 2 minutes at the full 15 lbs. pressure. A portion of the expanded peanuts was dried and roasted in one operation in an electric rotisserie using infrared heat at 350° F. for 31 minutes.

The finished product was judged as excellent.

Another portion of the expanded peanuts was treated prior to drying by moistening the surface of the nuts with water and adding 3% salt based on the weight of the peanuts. These salted nuts were then dried and roasted in one operation in an electric rotisserie for 17 minutes at 350° F.

This finished product also was judged as excellent and resembled that described in the preceding paragraph in appearance, but it had a salted taste.

In the following examples, Virginia peanuts are preheated in the presence of water to give a moisture content of about 13 weight percent, then heated to reduce the moisture content to below about 4 weight percent before pressing.

*Example 5*

Forty pounds of unblanched Virginia peanuts with a moisture content of 5.5% and an oil content of 49.6% were heated to 180° F., moistened with water to 13% moisture, and then heated to 220° F. for a total heating time of 45 minutes. These heated nuts were pressed in a hydraulic press for 60 minutes at 2,000 p.s.i. pressure. Moisture content of the pressed nuts was 4.2%, and the oil content 22.4%, which is equivalent to removal of approximately 72% of the oil. (Peanuts were screened on a four-mesh screen—32.8% passed through the screen, indicating appreciable breakage.) Peanut skins were removed prior to "expanding" by rubbing the peanuts between the hands in a motion similar to the rubbing action obtained between rubber rolls used for commercial blanching (physical means).

A portion of these deskinned nuts was expanded by heating 50 grams with 106 grams of water (to which had been added 6% salt and 4% sugar, based on weight of the nuts) in a pressure cooker for 21 minutes at 10 lbs. pressure (240° F.).

One portion of these expanded nuts was dried in a vacuum oven using a vacuum of 20.5 inches of mercury and a temperature of 248° F. for 43 minutes, and then roasted in a forced draft oven at 392° F. for 3 minutes.

Another portion of the expanded nuts was both dried and roasted in the forced draft oven. They were dried for 32 minutes at 248° F. and then roasted for 3 minutes at 408° F.

Both products had a commercially acceptable peanut taste.

*Example 6*

Unblanched Virginia peanuts were preheated, pressed, and blanched as in Example 5. The pressed nuts were expanded into their original size by mixing 50 grams of the pressed product with 156 grams of water, to which was added 12% salt and 4% sugar, based on weight of peanuts. The mixture was then heated in an open vessel (atmospheric pressure) for 14 minutes to attain a temperature of 212° F., and heating continued for an additional 25 minutes at 212° F. The expanded nuts contained 48% moisture. One portion of the expanded product was dried in a vacuum oven for 20 minutes at 212° F., and then roasted in a forced draft oven for 11 minutes at 342° F. Another portion was dried in a forced draft oven for 20 minutes at 239° F., and then roasted in the same oven for 6 minutes at 345° F.

Both portions were judged as excellent.

*Example 7*

Unblanched Virginia peanuts were preheated, pressed, and blanched as in Example 5. The pressed product was expanded by mixing 50 grams of the nuts with 106 grams of water, to which was added 3 grams of salt. The mixture was heated for 14 minutes to obtain a temperature of 212° F., and then heated for an additional 20 minutes at 212° F. One portion of these expanded peanuts was dried in a vacuum oven for 21 minutes at 220° F. and then roasted in a forced draft oven for 3 minutes at 464° F. Another portion of the expanded peanuts was vacuum dried for 21 minutes at 220° F. and then roasted in a forced draft oven for 10 minutes at 310° F.

Both portions had satisfactory texture, were not physically damaged, and were rated as excellent.

In the following two examples, the pressed nut meats were reconstituted in water under pressure.

*Example 8*

Unblanched Virginia peanuts (10 lbs.) containing 45.7% lipids (oil) and 6.2% moisture were pressed in a hydraulic press at room temperature (84° F.) and at 2,000 p.s.i. for 60 minutes. The pressed, flattened nuts, which had 81.5% of the oil removed, were re-expanded to their original size in a pressure cooker. This was done by adding 50 grams of the pressed nuts to 106 grams of water and heating to 15 lbs. pressure in 7 minutes, and for an additional 2 minutes at the 15 lbs. pressure. The expanded peanuts were dried at 215° F. for 25 minutes and then roasted for 9 minutes at 338° F.

This example shows that when unblanched peanuts are processed throughout, i.e., not removing the skins either before or after pressing, skins tend to adhere tightly to the peanuts. Also, there is a tendency for the skins to interfere with the attainment of a satisfactory roasting operation.

*Example 9*

Unblanched Virginia peanuts (10.9 lbs.) containing 46.2% oil and 6.8% moisture were pressed in a hydraulic press at room temperature at 2,000 p.s.i. pressure for 60 minutes, and blanched. A portion of these pressed, flattened, blanched nuts, which had 79.6% of the oil removed, was expanded. This was done by mixing equal parts of nuts and water (300 grams each) and heating the mixture in a pressure cooker for 7 minutes until a pressure of 15 lbs. was obtained, and then for 2 additional minutes at the 15 lbs. pressure. For initial drying of these wet expanded nuts, 66 grams were heated in hot peanut oil (330° F.) for 8 minutes and then removed, drained, and cooled immediately. The rapid evaporation of moisture from the peanuts minimized the absorption of oil. The moisture content of the dried peanuts was 1.9%, and the oil content 27.9%, which is equivalent to about 60% oil removed from the original raw peanuts.

*Example 10*

Spanish peanuts (583 grams) containing 44.9% oil and 6.0% water are pressed at room temperature (78° F.) for 40 minutes at 2,000 p.s.i., removing 71.8% of the oil present in the peanuts. The pressed nuts contain 7.1% water and 20.4% oil. A 50-gram portion of the pressed peanuts are expanded to their original size and shape using an equal weight of tap water and heating to 212° F. (atmospheric pressure) and holding at the boil for 5 minutes. The expanded peanuts are dried and roasted in one operation in a perforated rotating cylinder using infrared heat at 350° F. for about 20 minutes. The resulting partially-defatted, high-protein peanut product has a moisture content of 1.78%. Further, the partially-defatted, high-protein product has a uniform, roasted color, and an excellent, desirable taste.

*Example 11*

A charge of 200 grams of pecans (half-kernels) are pressed at room temperature (78° F.) at 2,000 p.s.i. for 60 minutes. The recovered oil is 123.1 grams, or 87.6% of the original oil present.

A portion of the pressed nuts are reconstituted (expanded) in boiling water at atmospheric pressure, and recover their original size and shape. When dry, a partially-defatted, high protein product results.

Other nuts which may be pressed and reconstituted to give partially-defatted, high-protein products are almonds, hickory nuts, cashews, walnuts, Brazil nuts, filberts, hazelnuts, macadamia nuts, and acorns.

In the following example, the raw peanuts containing high-calorie oil had a moisture content higher than the preferred 3 to 8 weight percent. In this example the moisture content was 11%.

*Example 12*

Unblanched (with skins) Virginia peanuts (583 grams) containing 44.1% oil and 11% moisture were pressed at ambient room temperature at 2,000 p.s.i. for 60 minutes. The amount of oil expressed was 14.1% of the original oil.

The pressed, distorted, unblanched peanuts were then blanched by rubbing between two surfaces.

Fifty grams of these pressed, distorted peanuts were reconstituted in 75 grams boiling water and maintained at the temperature for 8 minutes, at which time they were expanded satisfactorily.

After drying, they were roasted for 14.5 minutes at 350° F. in a rotisserie employing radiant heat.

The resulting product expanded satisfactorily, had good texture, flavor, aroma, and was commercially acceptable.

It was noted from the above example that when the moisture content of the raw peanut was too high, less oil was removed.

*Example 13*

In this example, unblanched Virginia peanuts from the same lot used in Example 12, but containing only 10% moisture, were used. Some of these peanuts (598 grams) containing 10% moisture and 44.6% oil were charged into a mechanical press and pressed at room temperature at 2,000 p.s.i. for 60 minutes, and 17.8% oil was removed.

After reconstitution, drying, and roasting the resultant product had expanded satisfactorily, and had a commercially acceptable color, flavor, and physical appearance.

It was noted that reducing the amount of moisture 1% improved the extraction of oil by about 3.5%.

When the moisture was reduced to about 6 weight percent of the raw peanuts, 78 weight percent of the original oil present was expressed.

*Example 14*

In the following example, the effect of pressure and time on the amount of the original oil expressed from raw peanuts is shown:

| Pressure (p.s.i.) | Time in Minutes | | | | |
|---|---|---|---|---|---|
| | 2 | 5 | 15 | 30 | 60 |
| 500 | 30.8 | 41.1 | 50 | 55.2 | 59.8 |
| 1,000 | 38.5 | 51.6 | 64 | 69.5 | 73.1 |
| 2,000 | 44.3 | 59.1 | 72.4 | 78.5 | 83.6 |
| 5,000 | 48.8 | 65.9 | 80.6 | 85.3 | 88.7 |

Upon reconstitution, these compressed, distorted peanuts were readily expanded to their general original size and shape, and could be roasted and flavored to give a crisp, highly-desirable food product.

We claim:

1. A process for preparing a dry, skin-free, partially-defatted, high-protein nut meat comprising
    (a) subjecting a high-calorie nut meat, having about from 3 to 8 weight percent moisture, and selected from the group consisting of a blanched raw nut meat, an unblanched raw nut meat, a blanched toasted nut meat, and an unblanched toasted nut meat, to pressing to remove about from 20 to 90 weight percent of the high-calorie oil therefrom, said pressing causing the nut meat to become physically distorted;
    (b) blanching the pressed nut meat to loosen its skin— when the high-calorie nut meat is an unblanched nut meat—and removing the thus-loosened skin from the blanched nut meat;
    (c) reconstituting the pressed nut meat from (a) or (b) above to its general original size and shape by immersing it in an aqueous vehicle comprising water and a flavoring agent whereby the nut meat absorbs about from 35 to 70 weight percent, based on the wet weight of the nut meat, of the aqueous vehicle, thereby to produce a reconstituted, flavored nut meat;
(d) drying the reconstituted, flavored nut meat to a moisture content of about from 3 to 8 weight percent, based on the total weight of the resulting dry product which comprises a flavored, skin-free, partially-defatted, high-protein nut meat; and
(e) recovering the said dry product.

2. A process for preparing a roasted, flavored, skin-free, partially-defatted, high-protein nut meat comprising
(a) subjecting a high-calorie nut meat, having about from 3 to 8 weight percent moisture, and selected from the group consisting of a blanched raw nut meat, an unblanched raw nut meat, a blanched toasted nut meat, and an unblanched toasted nut meat, to pressing to remove about from 20 to 90 weight percent of the high-calorie oil therefrom, said pressing causing the nut meat to become physically distorted;
(b) blanching the pressed nut meat to loosen its skin— when the high-calorie nut meat is an unblanched nut meat—and removing the thus-loosened skin from the blanched nut meat;
(c) reconstituting the pressed nut meat from (a) or (b) above to its general original size and shape by immersing it in an aqueous vehicle comprising water and a flavoring agent whereby the nut meat absorbs about from 35 to 70 weight percent, based on the wet weight of the nut meat, of the aqueous vehicle, thereby to produce a flavored reconstituted nut meat;
(d) drying the reconstituted, flavored nut meat to a moisture content of about from 3 to 8 weight percent, based on the total weight of the resulting dry product which comprises a flavored, skin-free, partially-defatted, high-protein nut meat;
(e) recovering the said dry product;
(f) roasting the recovered dry product at a temperature of about from 250° F. to 500° F. to a moisture content of about from 1 to 3 weight percent;
(g) immediately cooling the thus-roasted nut meat to a temperature below 100° F. thereby to obtain a cool, roasted product comprising a roasted, flavored, skin-free, partially-defatted, high-protein nut meat; and
(h) recovering the thus-obtained cool, roasted product.

3. The process of claim 2 wherein the high-calorie nut meat is a peanut containing about from 5 to 8 weight percent moisture.

4. The process of claim 2 wherein the high-calorie nut meat is an unblanched nut meat, and the skins are removed therefrom by physical means including (a) parallel, flexible, oil-resistant, solid surfaces which are softer than the surfaces of the nut meat, at least one of said parallel surfaces being in motion, and which are positioned so as to contact the surface of the nut meat and separate the loose skins therefrom, and (b) suction means to remove the thus-loosened, separated skins.

5. A process for preparing a roasted, flavored, skin-free, partially-defatted, high-protein nut meat comprising
(a) subjecting a high-calorie nut meat, having about from 3 to 8 weight percent moisture, and selected from the group consisting of a blanched raw nut meat, an unblanched raw nut meat, a blanched toasted nut meat, and an unblanched toasted nut meat, to pressing to remove about from 20 to 90 weight percent of the high-calorie oil therefrom, said pressing causing the nut meat to become physically distorted;
(b) blanching the pressed nut meat to loosen its skin— when the high-calorie nut meat is an unblanched nut meat—and removing the thus-loosened skin from the blanched nut meat;
(c) reconstituting the pressed nut meat from (a) or (b) above to its general original size and shape by immersing it in an aqueous vehicle comprising water and a flavoring agent whereby the nut meat absorbs about from 35 to 70 weight percent, based on the wet weight of the nut meat, of said aqueous vehicle, thereby to produce a reconstituted, flavored nut meat;
(d) drying and continuously roasting the reconstituted, flavored nut meat at a temperature of about from 225° F. to 500° F. to a moisture content of about from 1 to 3 weight percent;
(e) immediately cooling the thus-roasted nut meat to a temperature below 100° F. thereby to obtain a cool, roasted product comprising a roasted, flavored, skin-free, partially-defatted, high-protein nut meat; and
(f) recovering the thus-obtained cool, roasted product.

References Cited by the Examiner
UNITED STATES PATENTS

| | | | |
|---|---|---|---|
| 2,003,415 | 6/1935 | Ammann | 99—126 |
| 2,653,875 | 9/1953 | Wergeland | 99—126 |

A. LOUIS MONACELL, *Primary Examiner.*

S. E. HEYMAN, *Assistant Examiner.*